United States Patent
Baumann et al.

(10) Patent No.: US 9,346,712 B2
(45) Date of Patent: May 24, 2016

(54) MORTAR WITH HYDROXYETHYL METHYL CELLULOSE FOR SELF-COMPACTING CONCRETE

(71) Applicant: Dow Global Technologies LLC, Midland, MI (US)

(72) Inventors: Robert Baumann, Rueschlikon (CH); Grit Grote, Soltau (DE); Marc Schmitz, Verden/Aller (DE)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/435,525

(22) PCT Filed: Oct. 7, 2013

(86) PCT No.: PCT/US2013/063619
§ 371 (c)(1),
(2) Date: Apr. 14, 2015

(87) PCT Pub. No.: WO2014/062401
PCT Pub. Date: Apr. 24, 2014

(65) Prior Publication Data
US 2015/0259248 A1    Sep. 17, 2015

Related U.S. Application Data

(60) Provisional application No. 61/715,328, filed on Oct. 18, 2012.

(51) Int. Cl.
*C04B 28/02* (2006.01)
*C04B 24/38* (2006.01)
*C04B 28/04* (2006.01)
C04B 111/00 (2006.01)
C04B 103/44 (2006.01)

(52) U.S. Cl.
CPC ............. *C04B 24/383* (2013.01); *C04B 28/02* (2013.01); *C04B 28/04* (2013.01); *C04B 2103/44* (2013.01); *C04B 2111/00103* (2013.01); *Y02W 30/92* (2015.05); *Y02W 30/94* (2015.05)

(58) Field of Classification Search
CPC .... C04B 14/06; C04B 118/08; C04B 18/146; C04B 24/2647; C04B 24/383; C04B 24/386; C04B 28/02; C04B 28/04; C04B 18/08
See application file for complete search history.

(56) References Cited

U.S. PATENT DOCUMENTS

| 4,707,187 | A | * | 11/1987 | Tsuda ................... | C04B 24/383 106/730 |
| 5,372,642 | A | | 12/1994 | Bartz et al. | |
| 7,588,635 | B2 | * | 9/2009 | Yamakawa ............... | C04B 28/02 106/172.1 |
| 2011/0203488 | A1 | | 8/2011 | Xenopoulos et al. | |
| 2012/0006233 | A1 | * | 1/2012 | Lee ....................... | C04B 24/383 106/805 |
| 2012/0160132 | A1 | * | 6/2012 | Bayer ................... | C04B 24/383 106/780 |
| 2014/0287148 | A1 | | 9/2014 | Kiesewetter et al. | |

FOREIGN PATENT DOCUMENTS

| EP | 0573847 A1 | 12/1993 |
| EP | 1964826 A2 | 9/2008 |
| EP | 1983004 A1 | 10/2008 |
| WO | 03106369 A1 | 12/2003 |

OTHER PUBLICATIONS

Derwent-Acc-No. 2009-M40183, abstract of Korean Patent Specification No. KR 2009080333 A (Jul. 2009).*
Derwent-Acc-No. 2010-H59940, abstract of Korean Patent Specification No. KR 2010068808 A (Jun. 2010).*
W. C. Jau et al., "Development of a modified concrete rheometer to measure the rheological behavior of conventional and self-consolidating concretes," Cement and Concrete Composites, Elsevier Applied Science, Barking, vol. 32, No. 6, Jul. 1, 2010, pp. 450-460.
Petit et al., "Yield stress and viscosity equations for mortars and self-consolidating concrete," Cement and Concrete Research, vol. 37, No. 5, Apr. 13, 2007, pp. 655-670.
Walocel™ Visco Navigator Conversion Tool from Dow Wolff Cellulosics (a subsidiary of the Dow Chemical Company), Jan. 2005.

* cited by examiner

*Primary Examiner* — Anthony J Green
(74) *Attorney, Agent, or Firm* — Andrew E. C. Merriam

(57) ABSTRACT

A mortar contains cement, one or more than one mineral additive, superplasticizer, aggregates, a hydroxyethyl methyl cellulose and water, wherein the hydroxyethyl methyl cellulose is characterized by the sum of its hydroxyethyl molecular substitution and methyl degree of substitution is 1.90 or higher and 2.30 or lower and its viscosity as a 2 weight-percent aqueous solution that is below 30,000 milliPascals*seconds.

4 Claims, No Drawings

MORTAR WITH HYDROXYETHYL METHYL CELLULOSE FOR SELF-COMPACTING CONCRETE

BACKGROUND OF THE INVENTION

Field of the Invention

The present invention relates to mortars suitable for use in self compacting concrete formulations and, in particular, such mortars comprising hydroxyethyl methyl cellulose.

INTRODUCTION

Specialized concrete known as self-compacting concrete (SCC), also known as self-consolidating concrete, is a relatively new specialized material. Development of SCC has been attributed to Japanese researchers who discovered a concrete formulation now known as SCC. SCC compositions are different from other concrete formulations. SCC can flow around obstructions in a mold and flow into corners of a mold solely under its own weight without requiring vibrating to distribute the concrete in a mold. SCCs tend to flow without trapping air, thereby enabling casting of durable concrete structures of complex shapes without the complication of vibrating the structure during casting to distribute the material and remove air.

To achieve the desired performance of an SCC, the formulation must have a low-yield stress and a high plastic viscosity. Yield stress is a measure of the amount of energy needed to cause the SCC flow. To qualify as an SCC, the concrete must flow under its own weight. For a concrete to flow under its own weight it must have a low yield stress. Plastic viscosity is a measure of the resistance a material has to flow as a result of internal friction. SCC must have a high plastic viscosity in order to retain a homogenous mixture of suspended aggregates rather than allowing aggregates to segregate within the concrete formulation. The SCC must have a high plastic viscosity while avoiding segregation, excessive bleeding and excessive air entrapment. In order to achieve these desirable properties, SCC has a unique composition and is sensitive to composition changes.

The yield stress, plastic viscosity and other rheological properties of a SCC are dictated by the mortar of the SCC (that is, properties of a SCC mortar). It is common to develop concrete formulations by first developing mortar compositions having desirable rheological properties. The mortar can then be formulated with appropriate aggregate to form a SCC. Useful methods for characterizing a mortar to determine if it is suitable as an SCC mortar include a slump test, V-funnel discharge time and bleeding value. To be suitable for use as in an SCC formulation, it is particularly desirable for a mortar to simultaneously have a slump value that is greater than 290 millimeters, a V-funnel discharge time that is less than five seconds and a bleeding value the is less than three percent.

One of the components often used in SCC and SCC mortar is a viscosity modifying agent (VMA). VMAs typically serve to increase viscosity of a mortar and concrete. VMAs help to prevent segregation and bleeding and provide a concrete formulation that is robust against water variation and variation in raw materials. However, selection of a suitable VMA is challenging because while desirably increasing viscosity, the VMA may also undesirably increase the yield stress of the SCC and thereby inhibit its self compacting nature or increase its likelihood to trap air bubbles. Therefore, selection of an appropriate VMA for SCCs and SCC mortars is restricted, primarily, to a rather small group of materials. Examples of common VMAs used in SCCs include starch (which tends to detrimentally impact yield stress), clay (which tends to detrimentally impact yield stress), Welan gum and diutan gum (which are expensive and which tend to detrimentally impact plastic viscosity), hydroxyethyl cellulose (which tends to detrimentally impact flow properties) and synthetic polymers based on polyacrylates (which are expensive and which tend to detrimentally impact yields stress).

It is desirable to identify an alternative VMA suitable for use in SCC and SCC mortar that offers advantages over the current VMAs. For example, hydroxyethyl methyl cellulose (HEMC) is a VMA that is less expensive than many of the common VMAs. However, HEMC polymers are not used in SCC formulations because they tend to have too high of a viscosity, which results in a slump value that is too low for a quality SCC. HEMCs also tend to induce air entrainment in a mortar and concrete, thereby resulting in lower density and lower quality mortar and concrete. It is desirable to identify an alternative VMA that is suitable for formulating an SCC mortar that simultaneously has a slump value that is greater than 290 millimeters, a V-funnel discharge time that is less than five seconds and a bleeding value the is less than three percent. It would be further desirable if the VMA did not result in undesirably high air entrapment as experienced with typical HEMCs.

BRIEF SUMMARY OF THE INVENTION

The present invention offers a mortar suitable as an SCC mortar, or even an SCC, that comprises an alternative VMA. In particular the present invention provides an SCC mortar comprising a special HEMC that surprisingly provides a suitable combination of properties that meets the needs of a SCC mortar. In contrast to most HEMCs, the HEMCs used in the present invention do not have an excessively high viscosity (greater than 30,000 milliPascals*seconds for a 2 wt % aqueous solution) and can produce an SCC mortar with a desirable slump (greater than 290 millimeters), a V-funnel discharge time that is five seconds or less and a bleeding value that is less than three percent. The HEMC further surprisingly induces less air entrapment than other HEMC options.

Surprisingly research leading to the present invention revealed that HEMCs having a viscosity in a 2 weight-percent aqueous solution that is below 30,000 milliPascals*seconds and characterized by the sum of hydroxyethyl molecular substitution (MS) and methyl degree of substitution (DS) being 1.90 or higher and 2.30 or lower can serve as suitable viscosity modifying agents in preparing mortars acceptable as SCC mortars (that is, mortars having the aforementioned desirably slump values, V-funnel discharge times and bleeding values) even when other HEMCs are not suitable in such a use. More surprisingly, the particular HEMC further characterized by an MS value greater than 0.01 and 0.5 or less in combination with a DS value greater than 1.65 and 2.2 or less is particularly beneficial at achieving desirable slump values, V-funnel discharge time and bleeding values while achieving less air entrapment than other HEMCs.

In a first aspect, the present invention is a mortar comprising cement, one or more than one mineral additive, superplasticizer, aggregates, a hydroxyethyl methyl cellulose and water, wherein the hydroxyethyl methyl cellulose is characterized by the sum of its hydroxyethyl molecular substitution and methyl degree of substitution is 1.90 or higher and 2.30 or lower and its viscosity as a 2 weight-percent aqueous solution that is below 30,000 milliPascals*seconds.

The present invention is particularly useful as a self compacting concrete for use anywhere self compacting concrete is currently used.

DETAILED DESCRIPTION OF THE INVENTION

Test methods refer to the most recent test method as of the priority date of this document unless the test method number includes a different date. References to test methods contain both a reference to the testing society and the test method number. The following test method abbreviations apply herein: ASTM refers to ASTM International (formerly known as American Society for Testing and Materials); EN refers to European Norm; NF refers to association francaise de normalization; DIN refers to Deutsches Institute für Normung; and ISO refers to International Organization for Standards.

"Multiple" means two or more. "And/or" means "and, or as an alternative". All ranges include endpoints unless otherwise indicated. "Comp Ex" and "Comparative Example" are interchangeable as are "Example" and "Ex".

"Mortar" herein refers to a formulation comprising cement, water, and optionally additional additives. Mortars typically further comprise mineral additives, aggregate and a viscosity modifier.

"Concrete" herein refers to a mortar comprising coarse aggregates.

Mortars of the present invention comprise cement, water, fines, superplasticizer, aggregates and hydroxyethyl methyl cellulose and are particularly desirable for use in self compacting concrete formulations.

The cement can be any cement suitable for use in self compacting concrete (SCC) formulations. For example, the cement can be one or any combination of more than one cement selected from calcium silicate hydraulic cement, lime containing cement, alkali cement, plaster and gypsum. Particularly desirable is Portland cement, especially the types CEM I, II, III, IV, and V and/or alumina cement (aluminate cement).

Mineral additives are selected from slag (as defined the in NF EN 197-1 Standard, paragraph 5.2.2), pozzolanic materials (as defined in NF EN197-1 Standard, paragraph 5.2.3), fly as (as defined in NF En 197-1 Standard, paragraph 5.2.4), fly ash (as defined in NF EN 197-1 Standard paragraph 5.2.4), shale (as defined in NF EN 197-1 Standard paragraph 5.2.5), limestone (as defined in NF EN 197-1 Standard paragraph 5.2.6), and/or silica fume (as defined in NF EN 197-1 Standard paragraph 5.2.7).

Superplasticizer is a characteristic component of SCC mortar that increases flowability of the mortar, which enables the SCC mortar (or SCC itself) to readily conform around obstacles and fill voids in a space. Superplasticizers are also known as water reducers because they can reduce the water-cement ratio of a mortar. Suitable superplasticizers for use in the mortar of the present invention include any of those suitable for use in SCC formulation. Examples of suitable superplasticizers for use in the mortar of the present invention include sulfonated melamine formaldehyde condensates, sulfonated naphthalene formaldehyde condensates, lignosulfonates and polycarboxylates. Superplasticizers are typically present at a concentration of 0.1 wt % or more and 2.0 wt % or less based on total cement weight.

Aggregates are typically classified as fine and coarse aggregates. The mortar of the present invention can contain only fine aggregates, only coarse aggregates or, preferably, a combination of fine and coarse aggregates. Aggregates are graded as fine or coarse according to the classification of ASTM C33. In general, fine aggregates fully pass through a 9.5 millimeter (mm) sieve and up to 10 mass percent will pass through a 150 micrometer sieve (No. 100 sieve). Coarse aggregates are classified into a number of different grades according to ASTM C33 and are of larger overall size distribution than fine aggregates. Aggregates are generally naturally occurring inorganic materials such as rocks and/or minerals, where rocks generally are composed of several minerals. Fine aggregates are generally a form of sand. Coarse aggregates are often selected from gravel, crushed stone and similar materials.

The mortar of the present invention further comprises a particular type of hydroxyethyl methyl cellulose (HEMC). Surprisingly, the present invention is a result of discovering a particular type of HEMC that is suitable for use in mortars, particularly SCC mortars. The HEMC compounds of the present invention uniquely provide both ideal yield point and plastic viscosity levels in a mortar. It was further discovered that certain of the HEMC compounds entrap less air than other HEMC compounds, thereby causing less air entrapment in a mortar than other HEMC compounds. Generally, HEMC serves to increase plastic viscosity in a mortar without increasing yield point to an undesirably high level. The HEMC compounds of the present invention have particular levels and types of substitution that have surprisingly been found to increase plastic viscosity in a mortar without increasing yield point to an undesirably high level. Moreover, the HEMC of the present invention provides for a mortar that has a desirable slump (more than 290 millimeters), desirable V-funnel discharge (less than five seconds in the test described herein), and desirable bleeding values (less than three percent). Preferred embodiments of the present invention further have less entrapped air than mortars made using other HEMCs.

The HEMC of the present invention can be characterized by its MS and DS values. The MS value is a measure of the molecular substitution level of hydroxyethyl groups per anhydroglucose unit of the cellulose backbone in the HEMC (that is, the degree of hydroxyethyl molecular substitution). The DS value is a measure of the degree of substitution with methyl groups per anhydroglucose unit of the cellulose backbone (that is, degree of methyl of substitution). Determine MS and DS values for a HEMC by the Zeisel method for determining alkoxy linkages in an organic compound by treating with hydrogen iodide and red phosphorous. Examination of the resulting alkyloids and alkenes by gas chromatography allows determination of MS and DS values.

The HEMC of the present invention is characterized by the sum of the MS and DS values as being 1.90 or higher, preferably 1.95 or higher and at the same time being 2.30 or lower, and that can be 2.20 or lower, 2.15 or lower, 2.13 or lower, even 2.10 or lower.

It is further desirable that the HEMC have a MS that is greater than 0.01, preferably that is 0.05 or greater, still more preferably that is 0.1 or greater and even more preferably that is 0.18 or greater and at the same time that is 0.5 or less, preferably 0.4 or less, still more preferably 0.35 or less, even more preferably 0.33 or less. At the same time, the HEMC of the present invention desirably has a DS that is greater than 1.65, preferably 1.70 or greater, more preferably 1.72 or greater and still more preferably 1.8 or greater and at the same time that is less than 2.2, preferably 2.0 or less and more preferably 1.9 or less. If the MS value is less than 0.01 then the polymer would be essentially methyl cellulose, which has a thermogellation temperature sufficiently low that rheology control would be undesirably lost at temperature above 30° C. If the MS value is greater than 0.5 then the HEMC tends to result in a mortar that has excessive air entrapment and retainment properties, which undesirably results in low density mortar and lower quality concrete. If the DS value is less than 1.65 then the HEMC would have an unacceptable effect on cement setting retardation. If the DS value is greater than 2.2 then the HEMC is not sufficiently water soluble for use in a mortar. When the HEMC has MS and DS values in these preferred ranges it has been discovered that the HEMC is less likely to entrap air in a mortar than when the MS and DS values are outside these preferred ranges.

The HEMC of the present invention has a viscosity in a two weight-percent (wt %) aqueous solution that is less than 30,000 milliPascals*seconds (mPa*s). At the same time, it is desirable for the HEMC to have a viscosity of 1500 mPa*s or higher, preferably 3000 mPa*s or higher, and more preferably 5000 mPa*s or higher. Determine the viscosity of a two wt % aqueous solution of HEMC at 20° C. at a fixed shear rate of 2.55 $sec^{-1}$ in a Rotovisco rheometer. Determine wt % aqueous solution by the weight of HEMC relative to total weight of solution. If the HEMC has a viscosity in a two wt % aqueous solution that is greater than 30,000 mPa*s then the resulting mortar tends to have an undesirably low slump and/or a V-funnel time that is undesirably long, which means the flow properties of the mortar have become undesirable. If the viscosity of the HEMC is less than 1500 mPa*s, the HEMC tends to be too inefficient at modifying the viscosity of a mortar, required a great deal of HEMC to be added to modify viscosity.

The concentration of HEMC in the mortar of the present invention is desirably 0.01 wt % or more, preferably 0.05 wt % or more and at the same time is desirably 1.0 wt % or less, preferably 0.5 wt % or less based on total cement weight. If the concentration of HEMC is less than 0.01 wt % then the mortar or concrete will bleed and segregate due to insufficient stability. If the concentration of HEMC is more than 1.0 wt % then the mortar formulation becomes expensive and, depending on the HEMC viscosity, the mortar viscosity can become too high.

Water is also present in the mortar of the present invention. To form a quality mortar, the water-to-cement (water/cement) volume ratio should be as small as possible. It is desirable for the mortar to have a water/cement ratio of less than 0.5. Higher water/cement ratios will result in undesirably low concrete strength. The water/cement ratio should be high enough so as to fully hydrolyze the cement in the mortar. Typically, the water/cement ratio is 0.4 or higher. If the water/cement ratio is below 0.4 it is difficult to sufficiently hydrate the cement and insufficiently hydrated cement will result in undesirably low mortar or concrete strength.

The mortar can optionally comprise one or any combination of more than one additional additive if desired. For example, one or any combination of more than one of the following additives can be present in the mortar: accelerators, retardants, dispersants, synthetic thickeners, pigments, reducing agents, and defoamers. Generally, the mortar comprises up to five wt % of one or a combination of more than one additional additive.

The mortar has the following characteristics when characterized in an absence of coarse aggregate: slump value of more than 290 millimeters, a V-funnel discharge time that is less than five seconds and a bleeding value that is less than three percent.

Slump is a measure of much a mortar is able to flow under its own weight and, thereby, provides an indication of the yield stress of the mortar. Measure slump, also called slump flow, by depositing a set volume of mortar onto wetted glass and measuring the extent that the mortar spreads out. Set a cone funnel (slump cone) having a bottom opening diameter of 100 mm, a top opening diameter of 70 mm and a height of 60 mm with the bottom opening on a wetted glass plate (wetted 10 seconds before testing). Fill the cone with mortar and then quickly pull the cone vertically off from the plate to fully release the mortar onto the plate. Once the mortar ceases to spread measure the diameter of the resulting mortar cake in four locations spaced equally around the mortar cake. The average of the four diameters is the slump value for the mortar. A slump value of more than 290 mm is desirable and corresponds to a mortar having a yield stress low enough to serve as a SCC mortar.

V-funnel discharge time provides a measure of the flowability and viscosity of a mortar. The V-funnel discharge test uses a V-shaped rectangular funnel having a rectangular top opening that is 275 mm long and 30 mm wide. The funnel opening decreases uniformly in the 275 mm dimension to 30 mm over a height of 245 mm to form a 30 mm by 30 mm square funnel spout that extends for an additional height of 75 mm where the funnel has a flap that can reversibly close to seal the 30 mm by 30 mm bottom of the funnel. Wet the inside surface of the V-funnel and, with the flap closed, fill it mortar. Open the flap once the V-funnel is full and record how long it takes for the mortar to flow out from the bottom of the funnel. That time is the V-funnel discharge time. Mortars of the present invention desirably have a V-funnel discharge time that is less than five seconds. If the V-funnel discharge time is more than five seconds the mortar tends to have insufficient flow properties for a SCC.

Bleeding value is a measure of the extent of bleeding that a mortar experiences. Bleeding is the development of a layer of water at the top or surface of freshly placed concrete. It is caused by sedimentation of the solid particles in the mortar accompanied by upward displacement of water. While some bleeding is acceptable, excessive bleeding increases the water-cement ratio neat the tope surface and that can result in a weak top surface of concrete. Determine a bleeding value for a mortar by weighing a 500 milliliter (mL) cup, adding to the cup approximately 375 mL of mortar, weighing again to determine the weight of mortar in the cup, covering the cup and mortar to prevent evaporation of water and allow to sit for 30 minutes. After sitting, remove any surface water from the top of the mortar and weigh the cup and mortar again to determine how much water was removed. Repeat the removal of water and weighing of the cup every hour until bleeding has ceased. Calculate the bleeding value as a percent using the following formula:

$$\text{Bleeding (\%)}=100\times[\text{total mass of water removed (g)}]/[(W)\times(\text{Mortar Mass})]$$

where Mortar Mass is the mass of mortar initially put in the cup in grams and W is the mass ratio water in the initial mortar as determined by dividing the mass of water in the mortar in grams divided by the mass of the mortar in grams. Mortars of the present invention desirably have a bleeding value that is less than three percent.

A mortar desirably entraps as little air as possible during mixing, transporting and dispensing. When air becomes entrapped in a mortar, whether in mortar or concrete form, the resulting air voids form undesirable inhomogeneities in the resulting material that can be visually unattractive and that can structurally weaken the material. One of the drawbacks of using typical HEMCs as VMAs in a mortar is that HEMC tends to facilitate air retention in a mortar. Surprisingly, the mortar formulations of the present invention retain less air than mortar formulations containing HEMCs different from those specified in the present invention. In particular, it has been discovered that when the HEMC has a MS that is greater than 0.01, preferably that is 0.05 or greater, still more preferably that is 0.1 or greater and even more preferably that is 0.18 or greater and at the same time that is 0.5 or less, preferably 0.4 or less, still more preferably 0.35 or less, even more preferably 0.33 or less and, at the same time, has a DS that is greater than 1.65, preferably 1.70 or greater, more preferably 1.72 or greater and still more preferably 1.8 or greater and at the same time that is less than 2.2, preferably 2.0 or less and more preferably 1.9 or less the mortar tends to entrap less air than mortars containing HEMCs outside of this description.

One way to compare the extent of air entrainment in a mortar is by comparing the density of mortars. Similar mortars should have similar densities. A mortar having a lower density than a similar mortar has more air entrapped than the higher density mortar. The Examples and Comparative Examples herein illustrate that mortars of the present invention tend to have a lower density than comparable mortars with HEMCs outside the scope of the present invention.

Prepare mortars of the present invention by first adding all of the dry components together and mix, then add any aqueous components and then any remaining water followed by mixing. It is desirable to take care during mixing to minimize or avoid entraining air into the mortar while mixing.

The following examples serve to illustrate embodiments of the present invention.

EXAMPLES

Mortar Formulation

Prepare the mortars for the Examples and Comparative Examples using the components of Table 1 by first preparing a Dry-mix 1 by combining the cement, fly ash and stabilizer. Then prepare a Dry-mix 2 by combining the Aggregates 1-3. Then combine the water and superplasticizer in a mixing bowl for a ToniMIX mixer (available from Toni Technik). While mixing on mixing level one add Dry-mix 1 and Dry-mix 2 to the mixing bowl. Mix the resulting components for 30 seconds on level one and then for 30 seconds on level two. Allow the mixture to rest for 90 seconds to dissolve soluble additive and then mix again for 60 seconds on level two. The resulting mixture serves as a mortar.

TABLE 1

| Component | Identity | Mass (grams) |
| --- | --- | --- |
| Cement | Holcim PUR CEM I 42.5 | 1069 |
| Flyash | H4 from Steag GmbH | 713 |
| Water | | 646 |
| HEMC | (varies with example, see synthesis and identification below) | 0.5 |
| Superplasticizer | Glenium ™ 51 polycarboxylic ether hyperplasticizer from BASF; Glenium is a trademark of Research & Technology GmbH. | 8 |
| Aggregate 1 | Quarzsand H32 from Quarzwerke GmbH. | 1096 |
| Aggregate 2 | Sand having a particle size of 0.1-1.0 millimeters from M.u.E. Tebbe-Neuenhaus OHG. | 1233 |
| Aggregate 3 | Sand having a particle size of 1.0-2.0 millimeters from M.u.E. Tebbe-Neuenhaus OHG. | 685 |

HEMC Preparation

Prepare the HEMCs using a standard two stage pressure reaction as described, for example, in EP1180526B1 and EP1589035A1. The following discussion provides more specific guidance for the HEMCs of the present examples.

HEMC for Example (Ex) 1

Load finely ground wood cellulose pulp having an intrinsic viscosity of approximately 800 milliliters per gram (mL/g) into a jacketed, agitated reactor. Evacuate, purge the reactor with nitrogen, and then evacuate again to remove oxygen. Adjust the temperature to 25° C. In the first stage, spray 4.7 moles of dimethyl ether and 3.2 moles of methyl chloride onto the cellulose pulp per mole of cellulose. Then quickly add 1.19 moles of sodium hydroxide (50 wt % aqueous solution) per mole of cellulose. Stir the resulting mixture for 30 minutes at 25° C. and then add 0.5 moles of ethylene oxide per mole of cellulose to the reactor. Continuously heat the contents of the reactor to 80° C. by ramping up the temperature over 30 minutes. Allow the mixture to react for 30 minutes at 80° C.

Begin a second stage by adding another dose of 1.3 moles of methyl chloride per mole of cellulose. Then, after complete addition of the methyl chloride, quickly add another dose of 0.9 moles of sodium hydroxide (50 wt % aqueous solution) per mole of cellulose. Maintain a temperature of 80° C. for 80 minutes to complete the reaction. Dry and grind the resulting wet HEMC by any method known in the art.

HEMC for Ex 2

Prepare in like manner as the HEMC for Ex 1 except use 1.0 moles of sodium hydroxide per mole of cellulose in the second stage.

HEMC for Ex 3

Load finely ground wood cellulose pulp (intrinsic viscosity approx. 800 ml/g) into a jacketed, agitated reactor. Evacuate, purge the reactor with nitrogen, and then evacuate again to remove oxygen. Adjust the temperature to 45° C. In the first stage, spray 5.8 moles dimethyl ether per mole cellulose and 2.7 moles methyl chloride per mole cellulose onto the cellulose pulp. Then continuously add 2.3 moles sodium hydroxide (50 wt % aqueous solution) per mole cellulose over 18 minutes. Stir the resulting mixture for 2 minutes at 45° C. and then add 0.48 moles of ethylene oxide per mole cellulose to the reactor. Continuously heat the contents of the reactor to 70° C. over a 45 minute period. Begin a second reaction stage by adding 1.9 moles methyl chloride per mole cellulose. Directly after adding methyl chloride uniformly add 1.2 moles of sodium hydroxide (50 wt % aqueous solution) per mole cellulose over 31 minutes. Maintain a temperature of 70° C. for 10 minutes. Then heat the contents of reactor in 15 minutes to 80° C. and allow to react at this temperature for 55 minutes to complete the reaction. Dry and grind the resulting wet HEMC by any method known in the art.

HEMC for Ex 4

Prepare in like manner as the HEMC for Ex 3 except use a wood pulp having an intrinsic viscosity of approximately 1300 mL/g and use 0.32 moles of ethylene oxide per mole of cellulose instead of 0.48 in the first reaction step.

HEMC for Ex 5

Prepare in like manner as the HEMC for Ex 3 except use a wood pulp having an intrinsic viscosity of approximately 600 mL/g HEMC for Ex 6

Prepare in like manner as the HEMC for Ex 1 except use a cellulose pulp having an intrinsic viscosity of approximately 1300 mL/g and in the first reaction step use 0.85 moles of ethylene oxide per mole of cellulose and in the second reaction stage use 1.6 moles of sodium hydroxide (50 wt % aqueous solution) per mole of cellulose.

HEMC for Ex 7

Prepare in like manner as the HEMC for Ex 1 except use a cellulose pulp having an intrinsic viscosity of approximately 600 mL/g, in the first reaction stage use 5.5 moles dimethyl ether per mole cellulose and 2.3 moles methyl chloride per mole cellulose, 2.2 moles sodium hydroxide (50 wt % aqueous solution) per mole cellulose, and 0.28 moles ethylene oxide per mole of cellulose and in the second reaction stage use 2.3 moles methyl chloride per mole cellulose and 1.9 moles sodium hydroxide per mole cellulose (50 wt % aqueous solution).

HEMC for Comparative Example (Comp Ex) A

Prepare in like manner as the HEMC for Ex 1 except use a cellulose pulp having an intrinsic viscosity of approximately 1300 mL/g, in the first reaction stage use 4.5 moles dimethyl ether per mole cellulose and 1.8 moles sodium hydroxide (50 wt % aqueous solution) per mole cellulose, and 0.14 moles ethylene oxide per mole of cellulose and in the second reaction stage use 0.8 moles methyl chloride per mole cellulose and zero moles sodium hydroxide per mole cellulose (50 wt % aqueous solution).

HEMC for Comp Ex B

Prepare in like manner as the HEMC for Ex 1 except use a cellulose pulp having an intrinsic viscosity of approximately 1300 mL/g, in the first reaction stage use 0.14 moles ethylene oxide per mole of cellulose and in the second reaction stage use 0.2 moles sodium hydroxide per mole cellulose (50 wt % aqueous solution).

HEMC for Comp Ex C

Prepare in like manner as the HEMC for Ex 1 except use a cellulose pulp having an intrinsic viscosity of approximately 1300 mL/g, in the first reaction stage use 0.75 moles ethylene oxide per mole of cellulose and in the second reaction stage use 0.3 moles sodium hydroxide per mole cellulose (50 wt % aqueous solution).

HEMC for Comp Ex D

Prepare in like manner as the HEMC for Ex 1 except use a cellulose pulp having an intrinsic viscosity of approximately 1300 mL/g.

HEMC for Comp Ex E

Prepare in like manner as the HEMC for Ex 3 except use a cellulose pulp having an intrinsic viscosity of approximately 1500 mL/g, in the first reaction stage use 5.6 moles dimethyl ether per mole cellulose, 3.1 moles methyl chloride per mole cellulose, 2.4 moles sodium hydroxide (50 wt % aqueous solution) per mole cellulose, 0.35 moles ethylene oxide per mole cellulose and in the second reaction stage sue 1.5 moles methyl chloride per mole of cellulose and 0.8 moles sodium hydroxide (50 wt % aqueous solution) per mole cellulose.

HEMC for Comp Ex F

Prepare in like manner as the HEMC for Ex 1 except use a cellulose pulp having an intrinsic viscosity of approximately 1500 mL/g, in the first reaction stage use 4.5 moles dimethyl ether per mole cellulose, 0.13 moles ethylene oxide per mole cellulose and in the second reaction stage use 1.5 moles sodium hydroxide (50 wt % aqueous solution) per mole cellulose.

HEMC for Comp Ex G

Prepare in like manner as the HEMC for Ex 1 except use a cellulose pulp having an intrinsic viscosity of approximately 1800 mL/g.

HEMC for Comp Ex H

Prepare in like manner as the HEMC for Ex 3 except use a cellulose pulp having an intrinsic viscosity of approximately 1500 mL/g.

HEMC for Comp Ex I

Prepare in like manner as the HEMC for Ex 1 except use a cellulose pulp having an intrinsic viscosity of approximately 1500 mL/g, in the first reaction stage use 0.13 moles ethylene oxide per mole cellulose and in the second reaction stage use 0.7 moles sodium hydroxide (50 wt % aqueous solution) per mole cellulose.

HEMC for Comp Ex J

Prepare in like manner as the HEMC for Ex 1 except use a cellulose pulp having an intrinsic viscosity of approximately 1800 mL/g.

HEMC for Comp Ex K

Prepare in like manner as the HEMC for Ex 1 except use a cellulose pulp having an intrinsic viscosity of approximately 1300 mL/g, in the first reaction stage use 3.5 moles dimethyl ether per mole cellulose, 2.5 moles sodium hydroxide (50 wt % aqueous solution) per mole cellulose, and 1.7 moles ethylene oxide per mole cellulose and in the second reaction stage use 2.8 moles methyl chloride per mole cellulose and 3.0 moles sodium hydroxide (50 wt % aqueous solution) per mole cellulose.

HEMC for Comp Ex L

Prepare in like manner as the HEMC for Ex 1 except use a cellulose pulp having an intrinsic viscosity of approximately 1300 mL/g, in the first reaction stage use 1.1 moles ethylene oxide per mole cellulose and in the second reaction stage use 0.4 moles sodium hydroxide (50 wt % aqueous solution) per mole cellulose.

Example Characterization

Table 2 provides characterizations of mortars of the present invention with different values of MS, DS and viscosity. Determine slump, V-Funnel time and bleeding value as previously described herein. Determine fresh density of a mortar immediately after preparing according to the method of DIN EN 12350-7.

For each of these Examples, each of the slump, V-funnel time, bleeding value and density falls within the desired values for SCC mortar. As stated previously, the desired values for an SCC mortar are a slump greater than 290 mm, V-funnel time less than five seconds and a bleeding value that is less than three percent. For this particular mortar composition, it is also desirable to have sufficiently low air entrapment so as to achieve a fresh density that is greater than 2000 kilograms per cubic meter. Each of the Examples that have a DS between 1.65 and 2.2 and a MS between 0.01 and 0.5 achieve that low level of air entrapment in addition to the desired slump, V-Funnel time and Bleeding values.

TABLE 2

| Characteristic | Example | | | | | | | |
| --- | --- | --- | --- | --- | --- | --- | --- | --- |
|  | 1 | 2 | 3 | 4 | 5 | 6 | 7 | 8 |
| HEMC DS value | 1.69 | 1.72 | 1.83 | 1.84 | 1.85 | 1.87 | 1.9 | 1.46 |
| HEMC MS value | 0.28 | 0.29 | 0.26 | 0.18 | 0.25 | 0.33 | 0.05 | 0.67 |
| MS + DS | 1.97 | 2.01 | 2.09 | 2.02 | 2.10 | 2.20 | 1.95 | 2.13 |
| HEMC viscosity (mPa*s in 2 wt % aqueous solution) | 10060 | 10500 | 14000 | 21300 | 5430 | 26890 | 5340 | 25970 |

TABLE 2-continued

| Characteristic | Example | | | | | | | |
|---|---|---|---|---|---|---|---|---|
| | 1 | 2 | 3 | 4 | 5 | 6 | 7 | 8 |
| Mortar Slump (mm) | 303 | 297 | 291 | 293 | 294 | 295 | 292 | 298 |
| Mortar V-Funnel time (s) | 3.75 | 4.1 | 4.8 | 4.3 | 4.3 | 4.4 | 4.1 | 4.7 |
| Mortar Bleeding Value (%) | 1.2 | 2.8 | 0.19 | 2.7 | 0.43 | 2.5 | 0.38 | 0.8 |
| Mortar Fresh Density (kg/m$^3$) | 2032 | 2018 | 2031 | 2015 | 2040 | 2010 | 2048 | 1970 |

Table 3 provides characteristics for mortars that fall outside the scope of the present invention because the HEMCs have a value for MS+DS that is below the range suitable for use in the present invention. The data in Table 3 reveals that the slump and occasionally the V-funnel time the resulting mortars are outside the desired range for an SCC mortar (shown in bold italics). Even though Comp Exs A-C have a desirable Fresh Density, they fail to have desirable Slump and V-Funnel times, therefore fall outside the scope of the invention.

TABLE 3

| Characteristic | Comparative Example | | |
|---|---|---|---|
| | A | B | C |
| HEMC DS value | 1.15 | 1.31 | 1.35 |
| HEMC MS value | 0.06 | 0.08 | 0.43 |
| MS + DS | 1.21 | 1.39 | 1.78 |
| HEMC viscosity (mPa*s in 2 wt % aqueous solution) | 23430 | 27360 | 25540 |
| Mortar Slump (mm) | 253 | 274 | 289 |
| Mortar V-Funnel time (s) | 6 | 5.4 | 4.8 |
| Mortar Bleeding Value (%) | 0 | 0 | 0.7 |
| Mortar Fresh Density (kg/m$^3$) | 2043 | 2039 | 1944 |

Table 4 provides characteristics for mortars that fall outside the scope of the present invention because the HEMCs have a viscosity in a two wt % aqueous solution that is greater than 30,000 mPa*s. That data in Table 3 reveals that when the HEMC has such a high viscosity (even if the MS+DS value is within range) the slump value and typically the V-funnel time for the resulting mortar are outside the desired range for an SCC mortar (shown in bold italics).

TABLE 4

| Characteristic | Comparative Example | | | |
|---|---|---|---|---|
| | D | E | F | G |
| HEMC DS value | 1.7 | 1.85 | 1.71 | 1.68 |
| HEMC MS value | 0.28 | 0.15 | 0.08 | 0.29 |
| MS + DS | 1.98 | 2.00 | 1.79 | 1.97 |
| HEMC viscosity (mPa*s in 2 wt % aqueous solution) | 33480 | 38520 | 50570 | 60280 |
| Mortar Slump (mm) | 276 | 274 | 278 | 280 |
| Mortar V-Funnel time (s) | 5 | 5.4 | 5.1 | 5.8 |
| Mortar Bleeding Value (%) | 0 | 0 | 0.8 | 0.8 |
| Mortar Fresh Density (kg/m$^3$) | 2044 | 2021 | 1981 | 1937 |

Table 5 provides characteristics for additional mortars that fall outside the scope of the present invention because viscosity values for the HEMC are outside of the claimed range (shown in bold). The data in Table 5 illustrates that these mortars have Mortar V-Funnel times and typically slump values that are outside the desired range for an SCC mortar (shown in bold italics).

TABLE 5

| Characteristic | Comparative Example | | | |
|---|---|---|---|---|
| | H | I | J | K |
| HEMC DS value | 1.83 | 1.53 | 1.64 | 2.07 |
| HEMC MS value | 0.25 | 0.08 | 0.28 | 0.84 |
| MS + DS | 2.08 | 1.61 | 1.92 | 2.91 |
| HEMC viscosity (mPa*s in 2 wt % aqueous solution) | 45810 | 45880 | 60470 | 35720 |
| Mortar Slump (mm) | 270 | 279 | 260 | 298 |
| Mortar V-Funnel time (s) | 5.8 | 5.2 | 5.7 | 4.5 |
| Mortar Bleeding Value (%) | 0 | 0.9 | 0 | 2.5 |
| Mortar Fresh Density (kg/m$^3$) | 2014 | 1973 | 2028 | 1954 |

The invention claimed is:

1. A mortar comprising cement, one or more than one mineral additive, superplasticizer, aggregates, a hydroxyethyl methyl cellulose (HEMC) and water, wherein the hydroxyethyl methyl cellulose is characterized by the sum of its hydroxyethyl molecular substitution (MS) and methyl degree of substitution (DS) being 1.90 to 2.30 and its viscosity in a 2 weight-percent aqueous solution being below 30,000 milliPascals*seconds (at 20° C. at a fixed shear rate of 2.55 sec$^{-1}$ in a Rotovisco rheometer), wherein the MS and DS is determined by the Zeisel method of treating the HEMC with hydrogen iodide and red phosphorous.

2. The mortar of claim 1, further characterized by the hydroxyethyl methyl cellulose having a hydroxyethyl molecular substitution that is greater than 0.01 and 0.5 or less and a methyl degree of substitution that is greater than 1.65 and less than 2.2.

3. The mortar of claim 1, further characterized by the hydroxyethyl methyl cellulose being present at a concentration of 0.01 weight percent or more and 1.0 weight percent or less based on total weight of cement.

4. The mortar of claim 1, further characterized by comprising coarse aggregate so as to form a concrete.

* * * * *